United States Patent

Shibayama

(10) Patent No.: US 10,327,162 B2
(45) Date of Patent: Jun. 18, 2019

(54) CONTROL DEVICE, BASE STATION, CONTROL METHOD, AND STORAGE MEDIUM

(71) Applicant: KDDI CORPORATION, Tokyo (JP)

(72) Inventor: Masaya Shibayama, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 59 days.

(21) Appl. No.: 15/584,445

(22) Filed: May 2, 2017

(65) Prior Publication Data

US 2017/0238198 A1    Aug. 17, 2017

Related U.S. Application Data

(63) Continuation of application No. PCT/JP2015/067818, filed on Jun. 22, 2015.

(30) Foreign Application Priority Data

Jul. 9, 2014 (JP) ................................ 2014-141758
Sep. 17, 2014 (JP) ................................ 2014-189437

(51) Int. Cl.
*H04W 76/19* (2018.01)
*H04W 24/04* (2009.01)
(Continued)

(52) U.S. Cl.
CPC ........... *H04W 24/04* (2013.01); *H04W 28/04* (2013.01); *H04W 36/305* (2018.08);
(Continued)

(58) Field of Classification Search
CPC ..... H04W 24/02; H04W 76/19; H04W 24/04; H04W 28/04; H04W 28/06; H04W 76/04; H04W 76/18
See application file for complete search history.

(56) References Cited

U.S. PATENT DOCUMENTS 9,661,476 B2 *  5/2017 Wang .................... H04L 12/189
2003/0157927 A1 *  8/2003 Yi ........................ H04L 63/0457
                                                                455/411
(Continued)

FOREIGN PATENT DOCUMENTS

WO        2013/168752 A1    11/2013

OTHER PUBLICATIONS

Extended European Search Report dated Aug. 4, 2017, issue in corresponding European Patent Application No. 15818455.6. (9 pages).
(Continued)

*Primary Examiner* — Mohamed A Kamara
(74) *Attorney, Agent, or Firm* — Fitch, Even, Tabin & Flannery LLP

(57) ABSTRACT

A control device configured to control communication between a terminal and a base station manages, concerning the communication, first information representing a part of a number corresponding to an order of a packet and held by each of the terminal and the base station and second information representing another part of the number corresponding to the order of the packet and transmitted from the terminal to the base station, determines whether the first information matches between the base station and the terminal, and controls the terminal to transmit a signal used to execute reconnection processing for resetting the number of the packet upon determining that the first information does not match between the base station and the terminal.

15 Claims, 3 Drawing Sheets

(51) Int. Cl.
 *H04W 76/20* (2018.01)
 *H04W 28/04* (2009.01)
 *H04W 36/38* (2009.01)
 *H04W 36/30* (2009.01)
 *H04W 36/00* (2009.01)

(52) U.S. Cl.
 CPC ........... *H04W 36/38* (2013.01); *H04W 76/19* (2018.02); *H04W 76/20* (2018.02); *H04W 36/0055* (2013.01)

(56) References Cited

U.S. PATENT DOCUMENTS

| | | | |
|---|---|---|---|
| 2008/0123655 A1 | 5/2008 | Kim et al. | |
| 2009/0238142 A1* | 9/2009 | Chun | H04W 28/06 370/331 |
| 2010/0329452 A1* | 12/2010 | Alanara | H04L 9/065 380/44 |
| 2014/0098657 A1 | 4/2014 | Kubota et al. | |

OTHER PUBLICATIONS

Huawei et al.; "Discussion on HFN De-sync Problem for VOIP"; XP05056585; Jan. 30, 2012. (4 pages).

International Search Report dated Aug. 25, 2015 for PCT/JP2015/067818 and English translation of the same. (3 pages).

Huawei, HiSilicon, "CS over HSPA UL de-sync detection and recovery"; Jan. 21, 2010 (3 pages).

3GPP TS 36.300 V.8.0.0; Evolved Universal Terrestrial Radio Access (E-UTRA) and Evolved Universal Terrestrial Radio Access Network (E-UTRAN) (82 pages); Mar. 2007.

3GPP TS 36.331 V.11.8.0; Evolved Universal Terrestrial Radio Access (E-UTRA); Radio Resource Control (RRC) (354 pages); Jun. 2014.

3GPP TS 36.323 V.11.3.0; Evolved Universal Terrestrial Radio Access (E-UTRA); Packet Data Convergence Protocol (PDCP) specification (27 pages); Jun. 2014.

* cited by examiner

CONTROL DEVICE, BASE STATION, CONTROL METHOD, AND STORAGE MEDIUM

CROSS-REFERENCE TO RELATED APPLICATIONS

This application is a continuation of International Patent Application No. PCT/JP2015/067818 filed Jun. 22, 2015, and claims priority to Japanese Patent Application No. 2014-141758 filed Jul. 9, 2014 and Japanese Patent Application No. 2014-189437 filed Sep. 17, 2014, the entire contents of which are incorporated herein by reference.

TECHNICAL FIELD

The present invention relates to a control device, a base station, a control method, and a storage medium and, more particularly, to a technique of controlling communication between a terminal and a base station.

BACKGROUND ART

In recent years, communication services using a long term evolution (LTE) system are spreading nationwide. In communication between a base station and a terminal in the LTE system, a number concerning the order of a packet transmitted and received between the base station and the terminal is managed in a PDCP (Packet Data Convergence Protocol) layer. This number is specified by an HFN (Hyper Frame Number) and a PDCP-SN (Sequence Number) (NPL 1).

The HFN is a common number held by the base station and the terminal. The header of a packet is compressed using the HFN. Hence, the HFN needs to match between the base station and the terminal. On the other hand, the PDCP-SN is a number notified by a device on the transmitting side, and its value is incremented one by one on a packet basis. When the PDCP-SN reaches the maximum value, the devices on the transmitting and receiving sides increment the HFN by one.

That is, assume that the maximum value of the PDCP-SN is 127. If 128 packets with PDCP-SNs "0" to "127" are transmitted/received, the HFN is incremented by one. On the other hand, after reaching the maximum value, the PDCP-SN is reset to 0. If the PDCP-SN of a received packet is larger than the PDCP-SN of a previously received packet, the device on the receiving side does not increment the HFN. If the PDCP-SN of the received packet is equal to or smaller than the PDCP-SN of the previously received packet, the device increments the HFN. In this way, the device on the transmitting side and the device on the receiving side manage the order of a packet using the HFN and PDCP-SN, and compress or decode the header of the packet using the HFN of them.

CITATION LIST

Non Patent Literature

NPL 1: 3GPP TS 36.300 V.8.0.0
NPL 2: 3GPP TS 36.331 V.11.8.0
NPL 3: 3GPP TS 36.323 V.11.3.0

SUMMARY OF INVENTION

Technical Problem

Management of the above-described HFN and PDCP-SN is effective unless reception of packets in a number corresponding to the maximum value of the PDCP-SN fails. In the effective case, the order of a packet can be managed commonly between the device on the transmitting side and the device on the receiving side only by transmitting/receiving the 7-bit PDCP-SN, as compared to a case in which all parts (for example, 32 bits) of a packet number are transmitted.

On the other hand, if the device on the receiving side continuously fails in receiving packets in a number (for example, 128) corresponding to the maximum value of the PDCP-SN, the PDCP-SN of a packet successfully received next becomes larger than the PDCP-SN of a packet successfully received previously. Hence, the device on the receiving side does not increment the HFN, although the device on the transmitting side increments the HFN by one because it transmitted packets in the number corresponding to the maximum value of the PDCP-SN. For this reason, the device on the receiving side fails in decoding the headers of the packets and consequently discards data included in the packets for a long time. As a result, the communication error state continues for a long time because of the shift of the value of the HFN between the transmitting side and the receiving side.

The present invention has been made in consideration of the above-described problem, and has as its object to provide a technique for implementing early recovery from a communication error state if the value of the HFN shifts between the transmitting side and the receiving side.

Solution to Problem

According to an aspect of the present invention, there is provided a control device configured to control communication between a terminal and a base station, comprising a management unit configured to manage, concerning the communication, first information representing a part of a number corresponding to an order of a packet and held by each of the terminal and the base station and second information representing another part of the number corresponding to the order of the packet and transmitted from the terminal to the base station, a determination unit configured to determine whether the first information matches between the base station and the terminal, and a control unit configured to control the terminal to transmit a signal used to execute reconnection processing for resetting the number of the packet upon determining that the first information does not match between the base station and the terminal.

According to another aspect of the present invention, there is provided a control device configured to control communication between a terminal and a base station, comprising a management unit configured to manage, concerning the communication, first information representing a part of a number corresponding to an order of a packet and held by each of the terminal and the base station and second information representing another part of the number corresponding to the order of the packet and transmitted from the terminal to the base station, a determination unit configured to determine whether the first information matches between the base station and the terminal, and a control unit configured to control the base station to instruct the terminal to cause the terminal to perform handover without switching of the connected base station upon determining that the first information does not match between the base station and the terminal.

Advantageous Effects of Invention

According to the present invention, it is possible to provide a technique for implementing early recovery from a communication error state if the value of the HFN shifts between the transmitting side and the receiving side.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

The embodiments of the present invention will now be described in detail with reference to the accompanying drawings.

<<First Embodiment>>

(System Arrangement)

Figure 1:
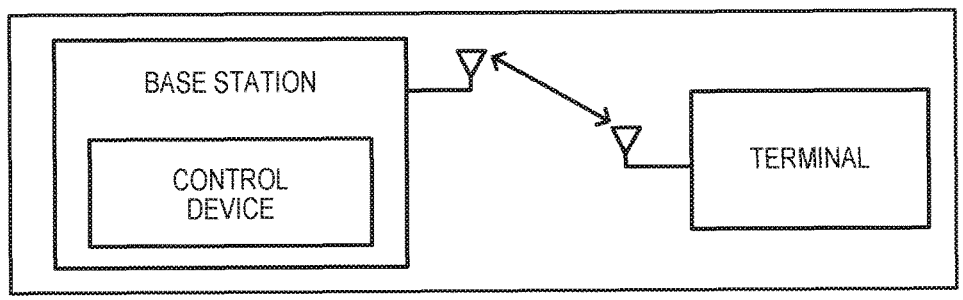
FIG. 1 is a view showing an example of the arrangement of a wireless communication system.

FIG. 1 is a view showing an example of the arrangement of a wireless communication system according to this embodiment. The wireless communication system according to this embodiment is, for example, an LTE system including a base station and a terminal. However, the wireless communication system can be any other wireless communication system which includes a plurality of communication devices and to which the following technique can be applied. The base station includes a control device configured to control communication between the base station and the terminal. The control device may exist as a network node outside the base station. A case in which a signal (packet) is transmitted from the terminal to the base station will be described below. However, the present invention is not limited to this.

In this embodiment, concerning a packet transmitted/received between the base station and the terminal, a number corresponding to the order of the packet is managed by, for example, 32 bits. A part (HFN) of the bits is held by the base station and the terminal, and the remaining part (PDCP-SN) is included in a packet and transmitted from the terminal (transmitting side) to the base station (receiving side). The PDCP-SN is represented by, for example, 7 bits and exhibits a value from 0 to 127. The HFN (Hyper Frame Number) and the PDCP-SN (Sequence Number) are represented by 32−7=25 bits. Using this value, the header of an associated packet is compressed or decoded. For this reason, if an HFN used by the terminal to compress the header of a packet and an HFN used by the base station to decode the header of the packet do not match, a decoding error occurs, and as a result, data in the packet is discarded. In this state, a decoding error occurs for a very long time, and then, the communication is disconnected. This problem is conspicuous in the UM (Unacknowledged Mode) in an RLC layer, for example, in VoLTE (Voice over LTE) that implements speech communication by the LTE system. That is, in VoLTE, data from the terminal does not reach the base station, a one-way communication state continues for a long time (for example, about 20 sec), and after that, the communication is disconnected by a host device such as IMS. Hence, the HFN mismatch exerts a very large influence on the service.

Here, if the value of the PDCP-SN of a packet successfully received next is smaller than the value of the PDCP-SN of a packet successfully received previously, the value of the HFN is incremented by one. Otherwise, the value is kept unchanged. For example, if the PDCP-SN of the packet successfully received previously is 120, and the PDCP-SN of the packet successfully received next is 127, the value of the HFN does not change. However, if the PDCP-SN of the packet successfully received next is 1, the value of the HFN is incremented by one. The order of a packet is thus managed by 32 bits as a whole. On the other hand, assume that the maximum value of the PDCP-SN is 127, and the reception continuously fails for 128 packets. In this case, if the PDCP-SN of the packet successfully received previously is 120, the PDCP-SN of the packet successfully received next is 121. If focus is placed only on the value of the PDCP-SN, the value of the HFN does not change on the receiving side because the value of the PDCP-SN increases. On the transmitting side, however, since the value of the HFN is changed in accordance with the number of transmitted packets, the value of the HFN is incremented by one in this case. Hence, an HFN mismatch occurs between the base station and the terminal.

On the other hand, by making the maximum value of the PDCP-SN large, the probability of occurrence of the mismatch can be reduced. For example, when the PDCP-SN is represented by 12 bits, the maximum value of the PDCP-SN is 4095. The HFN updating frequency lowers as compared to the case in which the PDCP-SN is represented by 7 bits. Accordingly, the probability of occurrence of the HFN mismatch lowers. However, making the maximum value of the PDCP-SN large means making the data size of a packet to be transmitted/received large. This has such an influence that, for example, data that can be transmitted/received by one packet in a case in which the PDCP-SN is formed from 7 bits needs to be transmitted/received by a plurality of packets.

For this reason, in this embodiment, assuming that the maximum value of the PDCP-SN is not made large, the control device (base station) executes a procedure of shortening the time during which a communication error state continues in a case in which an HFN mismatch occurs. The functional arrangement of the control device configured to execute this processing and a detailed example of the procedure of the processing will be described below.

(Arrangement of Control Device)

Figure 2:
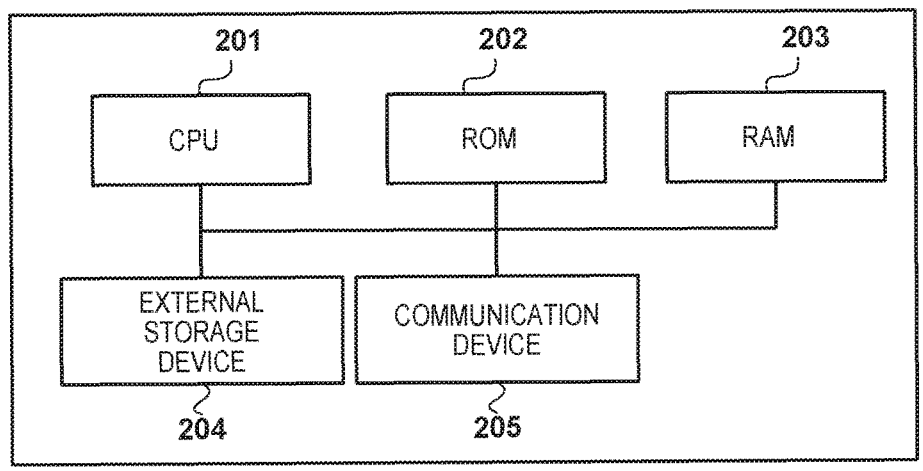
FIG. 2 is a block diagram showing an example of the hardware arrangement of a control device.

FIG. 2 is a block diagram showing an example of the hardware arrangement of the control device according to this embodiment. The control device includes, for example, a CPU 201, a ROM 202, a RAM 203, an external storage device 204, and a communication device 205. In the control device, for example, the CPU 201 executes a program that is configured to implement each function of the control device and recorded in one of the ROM 202, the RAM 203, and the external storage device 204. By, for example, controlling the communication device 205 by the CPU 201, the control device performs wired communication with the base station or various kinds of nodes in the network. Note that in FIG. 3, the control device includes the communication device 205. However, for example, if the control device exists in the base station, an interface to another hardware of the base station may alternately be provided.

Note that the control device may include dedicated hardware configured to execute each function. Alternatively, some functions may be executed by hardware, and the remaining portions may be executed by a computer in which a program is operated. The control device may execute all functions by a computer and a program.

Figure 3:
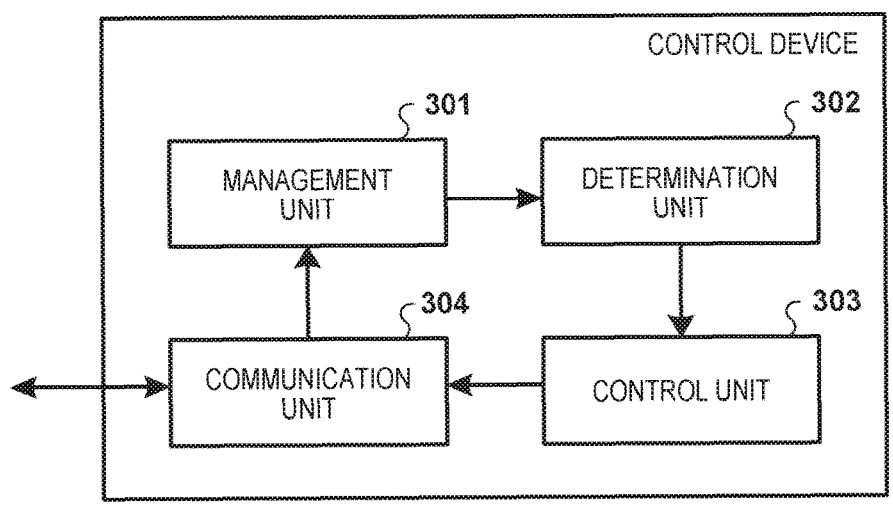
FIG. 3 is a block diagram showing an example of the functional arrangement of the control device.

FIG. 3 is a block diagram showing an example of the functional arrangement of the control device. The control device includes, for example, a management unit 301, a determination unit 302, a control unit 303, and a communication unit 304. The management unit 301 manages the HFN and the PDCP-SN. Note that if the control device exists in the base station, the management unit 301 manages the HFN and the PDCP-SN held by the base station. The communication unit 304 performs communication with, for example, the base station. Note that if the control device exists in the base station, such a communication unit can be given as an interface in the base station.

The determination unit 302 determines whether an HFN mismatch does not occur between a terminal and the base station. If, for example, a predetermined time or more elapses without reception of a packet from a terminal by the base station, and packet reception is then resumed in the base station, the determination unit 302 determines whether the count of header decoding failures in a plurality of packet after the resumption reaches a predetermined count. Upon detecting that the count of header decoding failures in the plurality of packet after the resumption reaches the predetermined count, the determination unit 302 determines that the HFN does not match. Note that the determination unit 302 may determine that the HFN does not match when packets from the terminal are not received by the base station for a predetermined time or more.

If the determination unit 302 determines that the HFN does not match, the control unit 303 controls the terminal to execute reconnection processing to reset the HFN (and PDCP-SN) held by the terminal and the base station. The control unit 303 causes the terminal to issue, for example, an RRC Connection Request as a connection request that is not based on the information (for example, a UE context) of the terminal. To do this, if the determination unit 302 determines that an HFN mismatch occurs, the control unit 303, for example, causes the base station to transmit a PDCCH Order to the terminal and causes the terminal to transmit an RACH (Random Access Channel). Note that PDCCH Order and the RACH can be different predetermined signals. After that the control unit 303 controls the base station and causes it to ignore the RACH from the terminal.

Then, the terminal resends the RACH a predetermined number of times, and after that, recognizes that a failure occurs in the radio link in accordance with, for example, the elapse of a time set as a parameter of the system or resend failures in a set count. As a result, the terminal transmits a reconnection request (ReEstablishment Request) using the UE context to the base station. The control unit 303 causes the base station to ignore or reject the reconnection request. Note that if, for example, the control unit 303 causes the base station to discard the UE context at this point of time, the base station consequently ignores or rejects the reconnection request. Then, the terminal subsequently issues the RRC Connection Request as a connection request that is not based on the information (for example, the UE context) of the terminal. The HFN and the PDCP-SN are thus reset in the connection between the terminal and the base station, and the HFN mismatch is eliminated. Accordingly, even if the HFN mismatch occurs, the mismatch can be eliminated in a short time.

(Procedure of Processing)

Figure 4:
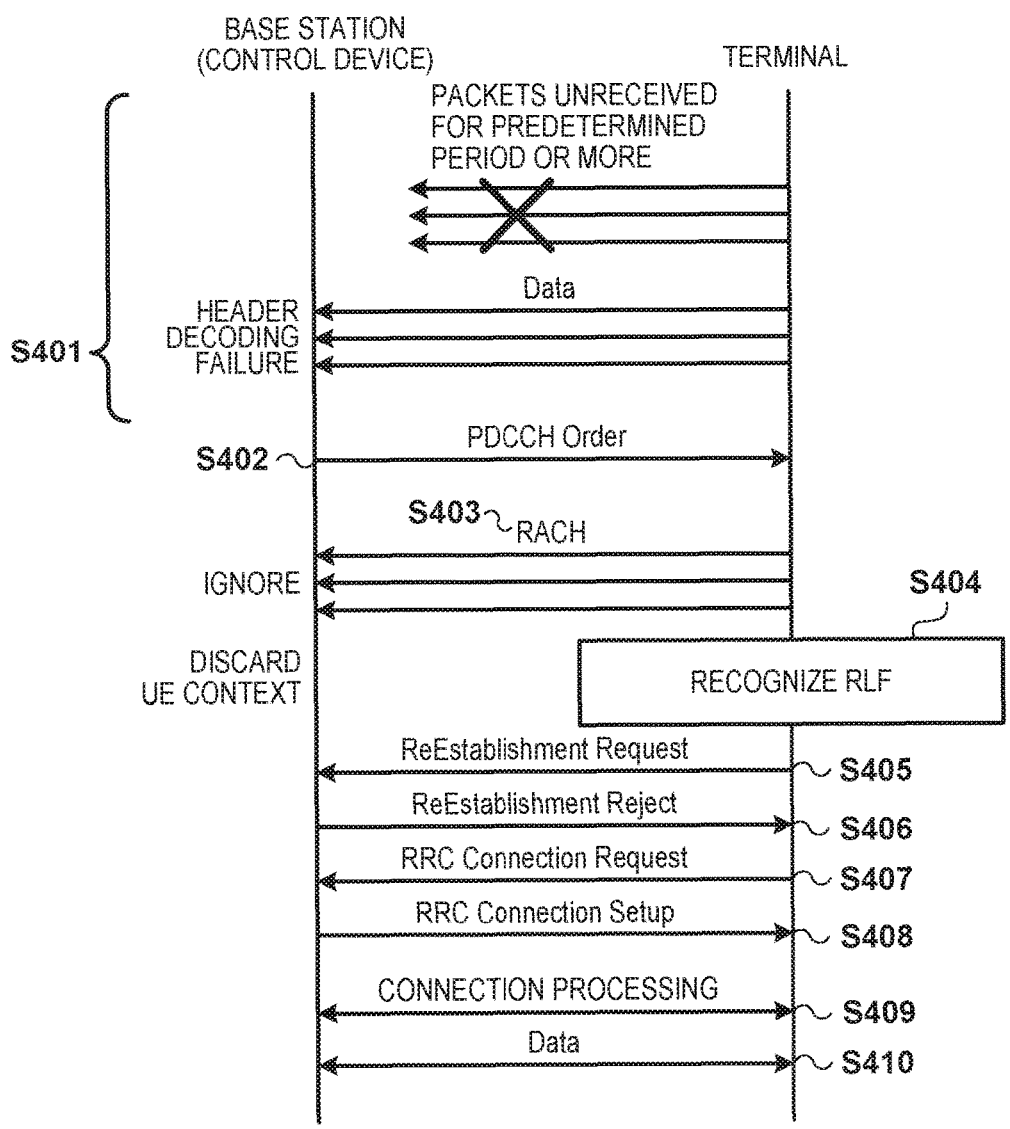
FIG. 4 is a sequence chart showing the procedure of processing of a wireless communication system according to the first embodiment.

FIG. 4 shows processing executed by the wireless communication system according to this embodiment. Note that the following explanation will be made assuming that the control device is included in the base station, and the base station operates as the control device. The procedure of processing does not change even if the control device exists outside the base station. However, when the control device exists outside the base station, signal exchange performed in the base station in the case in which the control device exists in the base station is replaced with communication (by, for example, a wired network) between the control device and the base station.

In this processing, first, the base station (control device) determines whether a mismatch occurs in the HFN (step S401). The base station determines whether, for example, a state in which no packet is received continues for a predetermined time or more, and determines, for a packet received after that, whether decoding of the header based on the HFN succeeds. The base station determines that a mismatch occurs in the HFN in a case in which the state in which no packet is received continues for the predetermined time or more, and after that, the number of packets for which header decoding based on the HFN does not succeed reaches a predetermined number.

Next, the base station transmits a PDCCH Order to the terminal (step S402) to promote the terminal to transmit an RACH. In response to this, the terminal transmits an RACH (step S403). On the other hand, the base station ignores the RACH transmitted from the terminal. Since no response to the RACH is returned, the terminal repetitively resends the RACH. The base station ignores this resending, too. Hence, if a time or resend count set as a parameter of the system is reached, the terminal recognizes that a failure occurs in the radio link (step S404). That is, the base station intentionally shifts the state of connection to the terminal to the state of Radio Link Failure (RLF) independently of the radio quality of the radio link.

When recognizing the RLF, the terminal transmits a reconnection request (ReEstablishment Request) using the information (UE context) of the terminal to the base station (step S405). The base station receives the reconnection request but rejects it (step S406). More specifically, the base station transmits, for example, a ReEstablishment Reject to the terminal. Note that the base station may ignore the reconnection request instead of explicitly rejecting it. In addition, the base station may discard the UE context before the reception of the above-described reconnection request.

After that, in accordance with the rejection of the ReEstablishment Request, the terminal transmits a connection request (RRC connection request) that does not use the information (UE context) of the terminal to the base station (step S407). The base station accepts the connection request (transmits an RRC connection setup to the terminal (step S408)), and a new connection is established between the base station and the terminal (step S409). By the establishment of the new connection, the HFN and the PDCP-SN are reset, and the HFN mismatch is eliminated. After that, the terminal resumes data transmission (step S410).

As described above, in the processing according to this embodiment, if the HFN mismatch is detected, reconnection processing for resetting the HFN and the PDCP-SN is executed. In a case in which the processing according to this embodiment is not executed, if an HFN mismatch occurs, header decoding fails, and data is continuously discarded for a long time (for example, about 20 sec). After that, the connection is disconnected by a host device such as IMS. On the other hand, in a case in which the processing according to this embodiment is executed, even if an HFN mismatch occurs, the HFN mismatch can be eliminated in a short time, and the connection can be maintained. For example, if the maximum value of the PDCP-SN is 127, and a packet is transmitted every 20 sec, the above-described process of step S401 needs about 2.5 sec. If the processes of steps S402 and S403 need about 600 ms, and the processes of steps S404 to S409 need about 250 to 300 ms, the HFN mismatch is eliminated in a total of 3.5 sec or less, and data transmission from the terminal to the base station is continued. As described above, according to this embodiment, it is possible to eliminate the HFN mismatch in a short time and maintain the connection.

<<Second Embodiment>>

In the first embodiment, after it is determined that a mismatch occurs in the HFN, the base station causes the terminal to transmit an RRC Connection request and execute reconnection processing without using the information of the terminal, thereby resetting the HFN and the PDCP-SN. In this embodiment, an example will be described in which after it is determined that a mismatch occurs in the HFN, a base station that is the connection destination of a terminal transmits, to the terminal, a handover instruction message that designates the same base station as a handover destination, thereby resetting the HFN and the PDCP-SN.

(Arrangement of System and Control Device)

The system arrangement and the arrangement of a control device according to this embodiment are the same as in the first embodiment, and a detailed description thereof will be omitted. Note that in the functional arrangement of the control device, the same operation as in the first embodiment is performed except the operation of a control unit 303.

That is, in this embodiment, if a determination unit 302 determines that the HFN does not match, the control unit 303 of the control device causes the base station to transmit a handover instruction message such that the terminal executes handover. The control unit 303 causes, for example, the base station as the connection destination of the terminal to transmit an RRC Connection Reconfiguration including mobilityControlInfo. At this time, the control unit 303 causes the base station that transmits the RRC Connection Reconfiguration to notify the terminal of the PCI (Physical Cell Identity) of the base station as the cell ID of the handover destination.

Upon receiving the RRC Connection Reconfiguration message including mobilityControlInfo, the terminal needs to do handover (see NPL 2). In addition, when receiving the message, the terminal needs to set the PDCP again (see NPL 2). When the PDCP is set again, the HFN and the PDCP-SN are reset to 0 (see NPL 3). Hence, the HFN mismatch in connection between the terminal and the base station is thus eliminated. Even if the HFN mismatch occurs, the mismatch can be eliminated in a short time.

(Procedure of Processing)

Figure 5:
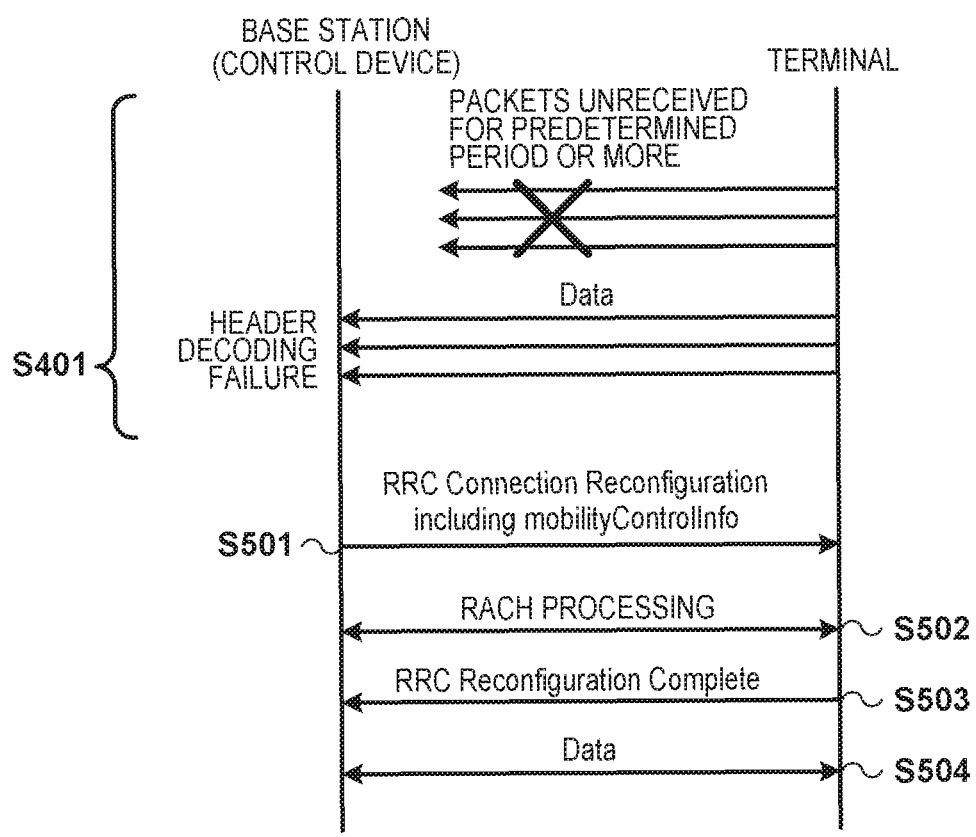
FIG. 5 is a sequence chart showing the procedure of processing of a wireless communication system according to the second embodiment.

FIG. 5 shows processing executed by a wireless communication system according to this embodiment. Note that the following explanation will be made assuming that the control device is included in the base station, and the base station operates as the control device. The procedure of processing does not change even if the control device exists outside the base station. However, when the control device exists outside the base station, signal exchange performed in the base station in the case in which the control device exists in the base station is replaced with communication (by, for example, a wired network) between the control device and the base station.

In this processing, first, the base station (control device) determines whether a mismatch occurs in the HFN (step S401). Note that since this processing is the same as in the first embodiment, the same reference numerals denote the same parts, and a detailed description thereof will be omitted.

Next, the base station transmits an RRC Connection Reconfiguration message including mobilityControlInfo as an information element to the terminal (step S501). This message is a handover instruction message that instructs the terminal to do handover. Note that the base station notifies the terminal of a PCI that designates the base station itself as the base station of the handover destination at this time. Note that this notification may be transmitted together with the message to instruct the handover, or may be transmitted independently of the message. The terminal thus executes handover without switching of the base station of the connection destination.

After that, RACH processing is executed between the base station and the terminal (step S502). If handover is completed, the terminal transmits an RRC Reconfiguration Completion message to the base station (step S503). By this handover, the HFN and the PDCP-SN are reset to 0, and the HFN mismatch is eliminated while maintaining the connection between the base station and the terminal. After that, the terminal resumes data transmission (step S504).

As described above, in the processing according to this embodiment, if the HFN mismatch is detected, handover processing without changing the base station of the connection destination is executed to reset the HFN and the PDCP-SN. In a case in which the processing according to this embodiment is executed, even if the HFN mismatch occurs, the HFN mismatch can be eliminated in a short time, and the connection can be maintained. For example, if the processes of steps S501 to S503 need about 100 ms to 200 ms, the HFN mismatch is eliminated in a total of 3 sec or less, and data transmission from the terminal to the base station is continued. As described above, according to this embodiment as well, it is possible to eliminate the HFN mismatch in a short time and maintain the connection.

Note that each process described above is conspicuously effective in an environment where the probability of occurrence of the HFN mismatch is not low, for example, in a case in which, for example, the PDCP-SN is formed from 7 bits in the RLC UM (Unacknowledged Mode) of LTE but is also effective in another mode or communication system. That is, in a case in which part of a number concerning the order of a packet is held on each of the transmitting side and the receiving side, and a mismatch of the number can occur, it is possible to maintain the connection while eliminating the mismatch in a short time by executing the above-described processing.

The present invention is not limited to the above embodiments, and various changes and modifications can be made within the spirit and scope of the present invention. Therefore, to apprise the public of the scope of the present invention, the following claims are made.

The invention claimed is:

1. A control device configured to control communication between a terminal and a base station, comprising:
   at least one processor coupled to a memory; and
   the memory that stores a computer program including computer-readable instructions, wherein the instructions, when executed by the at least one processor, cause the at least one processor to function as:

a management unit configured to manage, concerning the communication, first information representing a part of a number corresponding to an order of a packet and held by each of the terminal and the base station and second information representing another part of the number corresponding to the order of the packet and transmitted from the terminal to the base station;

a determination unit configured to determine whether the first information matches between the base station and the terminal; and a control unit configured to control the terminal to transmit a signal used to execute reconnection processing for resetting the number of the packet upon determining that the first information does not match between the base station and the terminal.

2. The control device according to claim 1, wherein upon determining that the first information does not match between the base station and the terminal, the control unit causes the terminal to issue a connection request that is not based on information of the terminal as the signal used to execute the reconnection processing.

3. The control device according to claim 2, wherein upon determining that the first information does not match between the base station and the terminal, the control unit causes the terminal to issue a reconnection request based on the information of the terminal by controlling the base station to cause the terminal to recognize that a failure occurs in a radio link between the base station and the terminal, and causes the terminal to issue the connection request that is not based on the information of the terminal by causing the base station to reject or ignore the reconnection request.

4. The control device according to claim 3, wherein upon determining that the first information does not match between the base station and the terminal, the control unit controls the base station to cause the terminal to transmit a predetermined signal and causes the base station to ignore the predetermined signal transmitted from the terminal, thereby causing the terminal to recognize that a failure occurs in a radio link.

5. The control device according to claim 3, wherein the control unit discards the information of the terminal before issuance of the reconnection request by the terminal, thereby rejecting or ignoring the reconnection request.

6. The control device according to claim 1, wherein the first information is used to decode at least part of the packet with which the first information is associated, and the determination unit determines that the first information does not match between the base station and the terminal in a case in which, for a plurality of packets received after not less than a predetermined time has elapsed without reception of a packet by the base station, a count of decoding failures based on the first information for the plurality of packet reaches a predetermined count.

7. A control device configured to control communication between a terminal and a base station, comprising:

at least one processor coupled to a memory; and the memory that stores a computer program including computer-readable instructions, wherein the instructions, when executed by the at least one processor, cause the at least one processor to function as:

a management unit configured to manage, concerning the communication, first information representing a part of a number corresponding to an order of a packet and held by each of the terminal and the base station and second information representing another part of the number corresponding to the order of the packet and transmitted from the terminal to the base station;

a determination unit configured to determine whether the first information matches between the base station and the terminal; and a control unit configured to control the base station to transmit, to the terminal, an instruction to cause the terminal to perform handover without switching of the connected base station upon determining that the first information does not match between the base station and the terminal.

8. The control device according to claim 6, wherein the control unit controls the base station to transmit, to the terminal, a handover instruction message that designates the base station as a handover destination.

9. The control device according to claim 7, wherein the first information is used to decode at least part of the packet with which the first information is associated, and the determination unit determines that the first information does not match between the base station and the terminal in a case in which, for a plurality of packets received after not less than a predetermined time has elapsed without reception of a packet by the base station, a count of decoding failures based on the first information for the plurality of packet reaches a predetermined count.

10. A base station configured to perform communication with a terminal and comprising a control device configured to control communication between a terminal and a base station, wherein the control device comprises:

at least one processor coupled to a memory; and the memory that stores a computer program including computer-readable instructions, wherein the instructions, when executed by the at least one processor, cause the at least one processor to function as:

a management unit configured to manage, concerning the communication, first information representing a part of a number corresponding to an order of a packet and held by each of the terminal and the base station and second information representing another part of the number corresponding to the order of the packet and transmitted from the terminal to the base station;

a determination unit configured to determine whether the first information matches between the base station and the terminal; and a control unit configured to control the terminal to transmit a signal used to execute reconnection processing for resetting the number of the packet upon determining that the first information does not match between the base station and the terminal, wherein the control device.

11. A base station configured to perform communication with a terminal and comprising a control device configured to control communication between a terminal and a base station, wherein the control device comprises:

at least one processor coupled to a memory; and the memory that stores a computer program including computer-readable instructions, wherein the instructions, when executed by the at least one processor, cause the at least one processor to function as:

a management unit configured to manage, concerning the communication, first information representing a part of a number corresponding to an order of a packet and held by each of the terminal and the base station and second information representing another part of the number corresponding to the order of the packet and transmitted from the terminal to the base station;

a determination unit configured to determine whether the first information matches between the base station and the terminal; and a control unit configured to control the base station to transmit, to the terminal, an instruction to cause the terminal to perform handover without switching of the connected base station upon determining that the first information does not match between the base station and the terminal.

12. A control method of a control device configured to control communication between a terminal and a base station, the method comprising:

determining whether first information, representing a part of a number corresponding to an order of a packet and held by each of the terminal and the base station, matches between the base station and the terminal; and controlling the terminal to transmit a signal used to execute reconnection processing for resetting the number of the packet upon determining that the first information does not match between the base station and the terminal.

13. A control method of a control device configured to control communication between a terminal and a base station, the method comprising:

determining whether first information, representing a part of a number corresponding to an order of a packet and held by each of the terminal and the base station, matches between the base station and the terminal; and controlling the base station to transmit, to the terminal, an instruction to cause the terminal to perform handover without switching of the connected base station upon determining that the first information does not match between the base station and the terminal.

14. A non-transitory computer-readable storage medium storing a program that causes a computer provided in a control device configured to control communication between a terminal and a base station to execute:

determining whether first information, representing a part of a number corresponding to an order of a packet and held by each of the terminal and the base station, matches between the base station and the terminal; and controlling the terminal to transmit a signal used to execute reconnection processing for resetting the number of the packet upon determining that the first information does not match between the base station and the terminal.

15. A non-transitory computer-readable storage medium storing a program that causes a computer provided in a control device configured to control communication between a terminal and a base station to execute:

determining whether first information, representing a part of a number corresponding to an order of a packet and held by each of the terminal and the base station, matches between the base station and the terminal; and controlling the base station to transmit, to the terminal, an instruction to cause the terminal to perform handover without switching of the connected base station upon determining that the first information does not match between the base station and the terminal.

* * * * *